United States Patent
Ghazal et al.

(10) Patent No.: US 7,672,926 B2
(45) Date of Patent: *Mar. 2, 2010

(54) METHOD AND SYSTEM FOR UPDATING VALUE CORRELATION OPTIMIZATIONS

(75) Inventors: Ahmad Said Ghazal, Redondo Beach, CA (US); Paul Laurence Sinclair, Manhattan Beach, CA (US)

(73) Assignee: Teradata US, Inc., Miamisburg, OH (US)

( * ) Notice: Subject to any disclaimer, the term of this patent is extended or adjusted under 35 U.S.C. 154(b) by 371 days.

This patent is subject to a terminal disclaimer.

(21) Appl. No.: 11/837,556

(22) Filed: Aug. 13, 2007

(65) Prior Publication Data

US 2007/0276798 A1    Nov. 29, 2007

Related U.S. Application Data

(63) Continuation of application No. 10/762,735, filed on Jan. 22, 2004, now Pat. No. 7,272,591.

(51) Int. Cl.
*G06F 17/30* (2006.01)
*G06F 17/45* (2006.01)

(52) U.S. Cl. .............................. 707/2; 707/101; 707/102

(58) Field of Classification Search ........................ None
See application file for complete search history.

(56) References Cited

U.S. PATENT DOCUMENTS 6,275,818 B1 * 8/2001 Subramanian et al. ......... 707/2
6,957,225 B1 * 10/2005 Zait et al. ..................... 707/102

OTHER PUBLICATIONS

Sight and Seer: Efficient Production and Reduction of Query Optimizer Plan Diagrams—Jul. 2008.*
Proactive Reomptimization—Jun. 14-16, 2004.*
Query Cost Model Constructed and Analyzed in a Dynamic Environment—Jun. 7-9, 2004.*

* cited by examiner

*Primary Examiner*—Neveen Abel Jalil
*Assistant Examiner*—Isaac T Jackson
(74) *Attorney, Agent, or Firm*—Howard Speight

(57) ABSTRACT

A method, computer program, and database system are disclosed for executing database queries. The database includes a first table (T1) having a primary key (PK) column and a first correlated value column (CV1) and a second table (T2) having a foreign key (FK) column related to the primary key column of the first table and a second correlated value column (CV2). One implementation of the method includes preparing a database query for execution based at least in part on application of a derived constraint rule (DCR) having the form, $(PK=FK) \rightarrow CV_2 + C_1 \leq CV_1 \leq CV_2 + C_2$, where $C_1$ and $C_2$ are constants and "$\rightarrow$" means "implies," to produce an execution plan. A frequency of errors due to changes in DCRs is taken into account when preparing the execution plan. The plan is then executed.

9 Claims, 6 Drawing Sheets

METHOD AND SYSTEM FOR UPDATING VALUE CORRELATION OPTIMIZATIONS

This application is a continuation of U.S. patent application Ser. No. 10/762,735 filed on Jan. 22, 2004, now U.S. Pat. No. 7,272,591.

BACKGROUND

Query optimization is important in relational database systems that deal with complex queries against large volumes of data. Unlike earlier navigational databases, a query on a relational database specifies what data is to be retrieved from the database but not how to retrieve it. Optimizing a query against a relational database is not as important in transaction-oriented databases where only a few rows are accessed either because the query is well specified by virtue of the application or because the query causes the data to be accessed using a highly selective index. In decision support and data mining applications, where the space of possible solutions is large and the penalty for selecting a bad query is high, optimizing a query to reduce overall resource utilization can provide orders of magnitude of overall performance improvement.

One existing query optimization technique is to rewrite the user-specified query. The query is transformed into a logically equivalent query that costs less, i.e., requires less time, to execute. The existing techniques for query transformation include syntactic and semantic techniques. Syntactic or algebraic transformations use the properties of the query operators and their mapping to rewrite the query. Some forms of magic set transformation, most forms of predicate push down, and transitive closures are techniques that fall under this category. Semantic query transformations use declarative structural constraints and the semantics of an application's specific knowledge, declared as part of the database, to rewrite the query. Semantic query transformation based rewrites are called semantic query optimization or SQO.

An SQO technique that bases a query rewrite on the current values stored in the database can raise issues when a concurrent transaction requests an insertion, deletion, or modification of those values. For example, an SQO can rewrite a query to reduce the numbers of rows accessed based on a known relationship between values in particular columns. If, however, the values are changed or a record is inserted with columns having values that do not meet the relationship, an inaccurate query result could be produced.

SUMMARY

In general, in one aspect, the invention features a method for executing database queries. The database includes a first table (T1) having a primary key (PK) column and a first correlated value column (CV1) and a second table (T2) having a foreign key (FK) column related to the primary key column of the first table and a second correlated value column (CV2). One implementation of the method includes preparing a database query for execution based at least in part on application of a derived constraint rule (DCR) having the form, (PK=FK)→$CV_2+C_1 \leq CV_1 \leq CV_2+CV_2$, where $C_1$ and $C_2$ are constants and "→" means "implies," to produce an execution plan. A frequency of errors due to changes in DCRs is taken into account when preparing the execution plan. The plan is then executed.

Implementations of the invention may include one or more of the following. Taking into account the frequency of errors due to changes in DCRs when preparing the execution plan may include determining that a higher cost execution plan that risks no errors due to changes in DCRs is preferable. Taking into account the frequency of errors due to changes in DCRs when preparing the execution plan may include determining that a higher cost execution plan that may require correction of an error due to changes in DCRs is preferable because it has a low cost if there is no error due to changes in DCRs. Taking into account the frequency of execution errors due to changes in DCRs when preparing the execution plan may include selecting an execution plan that balances the cost of correcting errors due to changes in DCRs and the cost of execution without errors due to changes in DCRs.

In general, in another aspect, the invention features a computer program for executing database queries. The database includes a first table (T1) having a primary key (PK) column and a first correlated value column (CV1) and a second table (T2) having a foreign key (FK) column related to the primary key column of the first table and a second correlated value column (CV2). One implementation of the program includes executable instructions that cause one or more computers to prepare a database query for execution based at least in part on application of a DCR having the form, (PK=FK)→$CV_2+C_1 \leq CV_1 \leq CV_2+C_2$, where $C_1$ and $C_2$ are constants and "→" means "implies," to produce an execution plan. A frequency of errors due to changes in DCRs is taken into account when preparing the execution plan. The plan is then executed.

In general, in another aspect, the invention features a database system for executing database queries. The database system includes one or more nodes; a plurality of CPUs, each of the one or more nodes providing access to one or more CPUs; and a plurality of virtual processes, each of the one or more CPUs providing access to one or more virtual processes, each virtual process configured to manage data, including rows organized in tables, stored in one of a plurality of data-storage facilities. The database system also includes a first table (T1) having a primary key (PK) column and a first correlated value column (CV1) and a second table (T2) having a foreign key (FK) column related to the primary key column of the first table and a second correlated value column (CV2). The database system also includes an optimizer that is configured to prepare a database query for execution based at least in part on application of a DCR having the form, (PK=FK)→$CV_2+C_1 \leq CV_1 \leq CV_2+C_2$, where $C_1$ and $C_2$ are constants and "→" means "implies," to produce an execution plan. A frequency of errors due to changes in DCRs is taken into account when preparing the execution plan.

DETAILED DESCRIPTION

Figure 1:
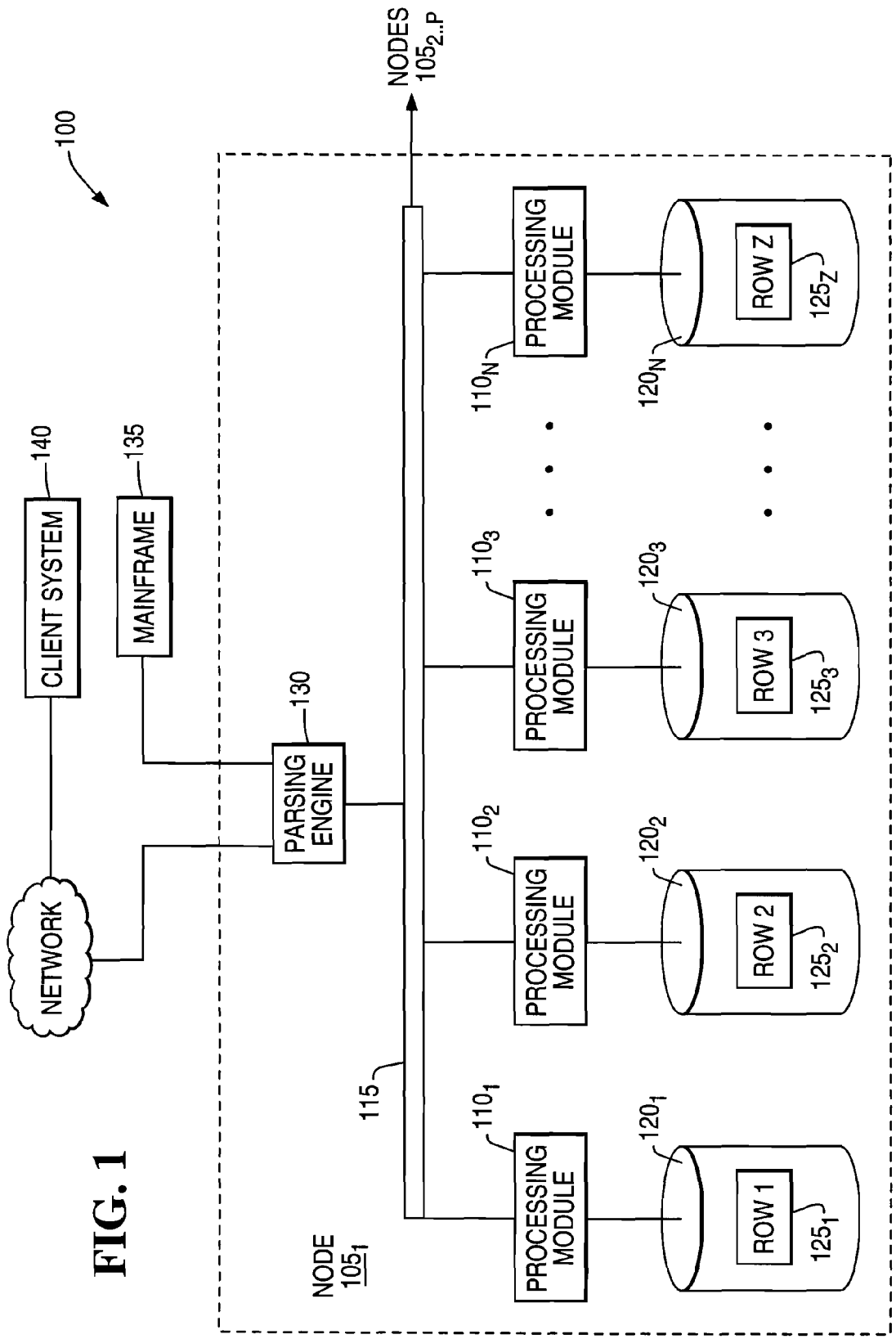
FIG. 1 is a block diagram of a node of a parallel processing database system.

The query execution technique disclosed herein has particular application, but is not limited, to large databases that might contain many millions or billions of records managed by the database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1...N}$, connected by a network 115, that manage the storage and retrieval of data in data-storage facilities $120_{1...N}$. Each of the processing modules $110_{1...N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the nodes operating system schedules the N virtual processors to run on its set of M physical processors. If there are 4 virtual processors and 4 physical processors, then typically each virtual processor would run on its own physical processor If there are 8 virtual processors and 4 physical processors, the operating system would schedule the 8 virtual processors against the 4 physical processors, in which case swapping of the virtual processors would occur.

Each of the processing modules $110_{1...N}$ manages a portion of a database that is stored in a corresponding one of the data-storage facilities $120_{1...N}$. Each of the data-storage facilities $120_{1...N}$ includes one or more disk drives. The DBS may include multiple nodes $105_{2...P}$ in addition to the illustrated node $105_1$, connected by extending the network 115.

The system stores data in one or more tables in the data-storage facilities $120_{1...N}$. The rows $125_{1...Z}$ of the tables are stored across multiple data-storage facilities $120_{1...N}$ to ensure that the system workload is distributed evenly across the processing modules $110_{1...N}$. A parsing engine 130 organizes the storage of data and the distribution of table rows $125_{1...Z}$ among the processing modules $110_{1...N}$. The parsing engine 130 also coordinates the retrieval of data from the data-storage facilities $120_{1...N}$ in response to queries received from a user at a mainframe 135 or a client computer 140. The DBS 100 usually receives queries and commands to build tables in a standard format, such as SQL.

In one implementation, the rows $125_{1...Z}$ are distributed across the data-storage facilities $120_{1...N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1...N}$ and associated processing modules $110_{1...N}$ by a hash bucket map. The characteristics of the columns chosen for the primary index determine how evenly the rows are distributed.

Figure 2:
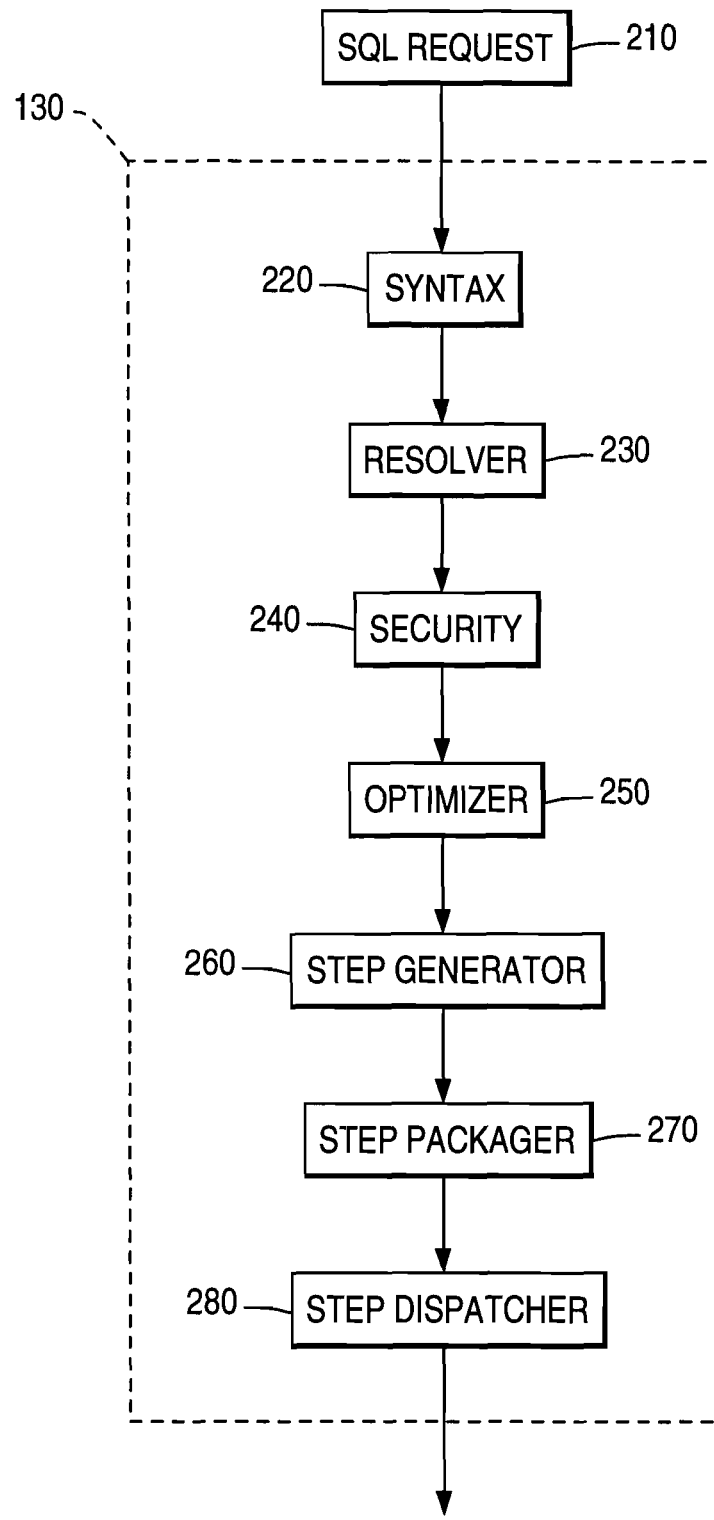
FIG. 2 is a block diagram of a parsing engine.

FIG. 2 components of the parsing engine 130. An SQL request 210 is submitted to the parsing engine 130 and is initially checked for syntax 220. The resolver 230 then checks for and reports semantic errors and determines additional conditions based on transitivity. If one condition requires that the price is $10 and another requires that the cost is half the price, a third condition can be determined by transitivity: the cost is $5. The new conditions can be redundant with the original conditions, but can result in faster execution. For example, it is possible for a query to run more quickly with conditions of price=$10 and cost=$5 than with conditions of price=$10 and cost=50%(price).

Once the query has been processed by the resolver 230, it is passed to the security component 240 of the parsing engine 130. The security component 240 checks the security level of the database user who initiated the query. The security component 240 also checks the security level of the information sought by the request. If the user's security level is less than the security level of the information sought, then the query is not executed.

Once the query passes security it is analyzed by the optimizer 250. The optimizer 250 determines possible series of steps for executing the query. The optimizer 250 can review characteristics of the data that needs to be manipulated to determine the query result by accessing a database system dictionary that stores information about the data. One type of information that can be stored about the data is a derived constraint rule (DCR), which describes a relationship between data in two different tables: a first table (T1) having a primary key (PK) column and a first correlated value column (CV1) and a second table (T2) having a foreign key (FK) column related to the primary key column of the first table and a second correlated value column (CV2).

For example, T1=Order and T2=Lineitem, where each record in the Order table identifies and order and corresponds to one or more records in the Lineitem table that identify individual items that were included in that order. Each order has an orderkey which is a PK of the Order table (O_orderkey) and an FK of the Lineitem table (L_orderkey). The Order table includes a column containing the date on which the order was received (O_orderdate) and the Lineitem table includes a column containing the date that the item was shipped (L_shipdate). In this example, items for a particular order are always shipped after the order is placed, but within 30 days. This data relationship can be expressed as a DCR in the form of $(PK=FK) \rightarrow CV_2+C_1 \leq CV_1 \leq CV_2+C_2$, where $C_1$ and $C_2$ are constants and "$\rightarrow$" means "implies:"

(Lineitem.L_orderkey=Order_orderkey)→O_orderdate+1≦L_shipdate≦O_orderdate+30

In this example the above rule would be stored in the database system dictionary.

The example derived constraint rule can be applied to a database query as part of the optimizer's preparation of that query for execution.

SELECT O_ORDERPRIORITY, COUNT(*) (NAMED ORDER_COUNT) FROM ORDERTBL, LINEITEM WHERE O_ORDERDATE=<'1993-07-01' AND L_ORDERKEY=O_ORDERKEY GROUP BY O_ORDERPRIORITY;

Based on the conditions of the query, the DCR can be applied to produce an additional condition L_shipdate≦'1993-07-31' that can be used to produce an execution plan. The optimizer 250 can then prepare series of steps each of which does or does not include the derived condition. Any steps in the eventual execution plan that result from the derived condition are DCR-dependent steps.

The optimizer 250 also estimates the costs associated with each series of steps. The cost associated with a series of steps is related to the amount of data encompassed by each condition corresponding to a step in the series. The execution of a query involves temporary results and sub-query results and the amount of data in those results is one factor in determining the costs of executing the query. A temporary result that requires a large amount of system resources to generate has a high cost.

After estimating the costs associated with potential query execution plans, the optimizer 250 chooses the plan that has the lowest estimated cost. The more accurate the estimates of cost for particular execution plans, the more likely the optimizer 250 is to choose the correct plan. The optimizer 250 can access statistics describing the information stored in the database to help estimate the cost of conditions and temporary results corresponding to steps in query execution plans.

The plan chosen by the optimizer 250 is passed to the step generator 260. The steps are then sent to the step packager 270 and dispatched from the step dispatcher 280. If the plan chosen is not the optimal plan, the steps generated will require the use of more resources than the steps that would be generated by another plan that yields the same output. In a parallel database system servicing thousands of concurrent users, an increase in the resources employed for reach query can result in longer wait times for every user.

Figure 3:
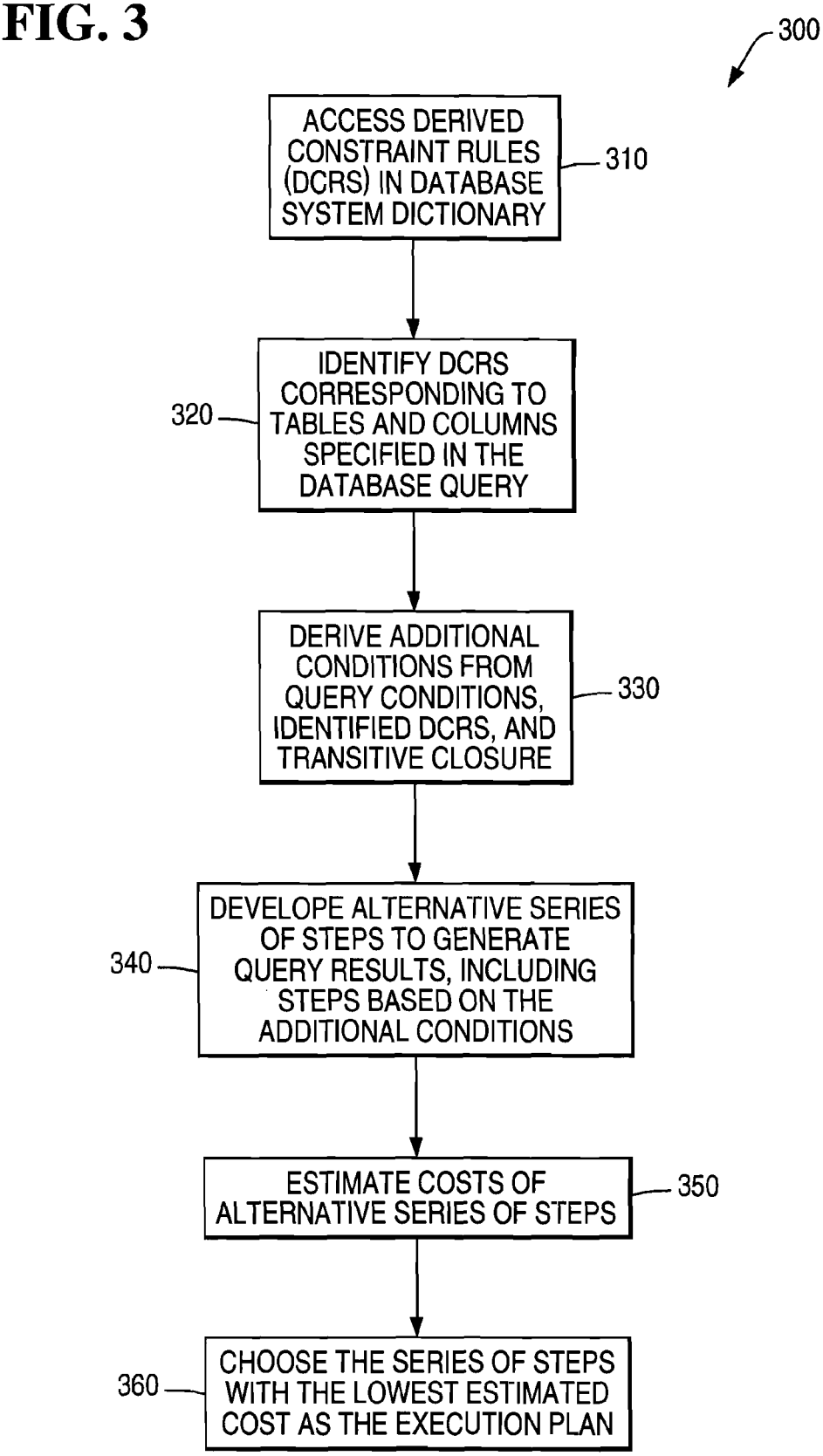
FIG. 3 is a flow chart of one method for applying a derived constraint rule to a database query.

FIG. 3 is a flow chart of one method 300 for applying a DCR to a database query. As discussed above, the optimizer 250 can access and apply DCRs to a database query to produce an execution plan. In alternative implementations, a different database system component can apply the DCR to the query. In the first step 310, the DCRs stored in the database system dictionary are accessed. In the second step 320, DCRs are identified that correspond to the tables and columns specified in the query. For example, a DCR that includes a PK for a table that is not specified in the query is not identified, but if the PK and FK for the DCR are joined in the query and one of the CVs is part of a condition, then the DCR is identified. In the third step 330, additional conditions are derived from the query conditions, the identified DCRs, and transitive closure. Transitive closure produces the additional conditions as discussed with respect to the resolver 230. In the fourth step 340, the optimizer 250 (or an alternative element) generates alternative series of steps. Each series of steps can generate the correct query result. At least one of the series of steps includes one or more steps based on the DCR conditions. In the fifth step 350, the cost for each series of steps is estimated. In the last step 360, the series of steps with the lowest estimated cost is chosen as the execution plan. In one implementation, the steps that are DCR-dependent are marked by the parser 130.

Figure 4:
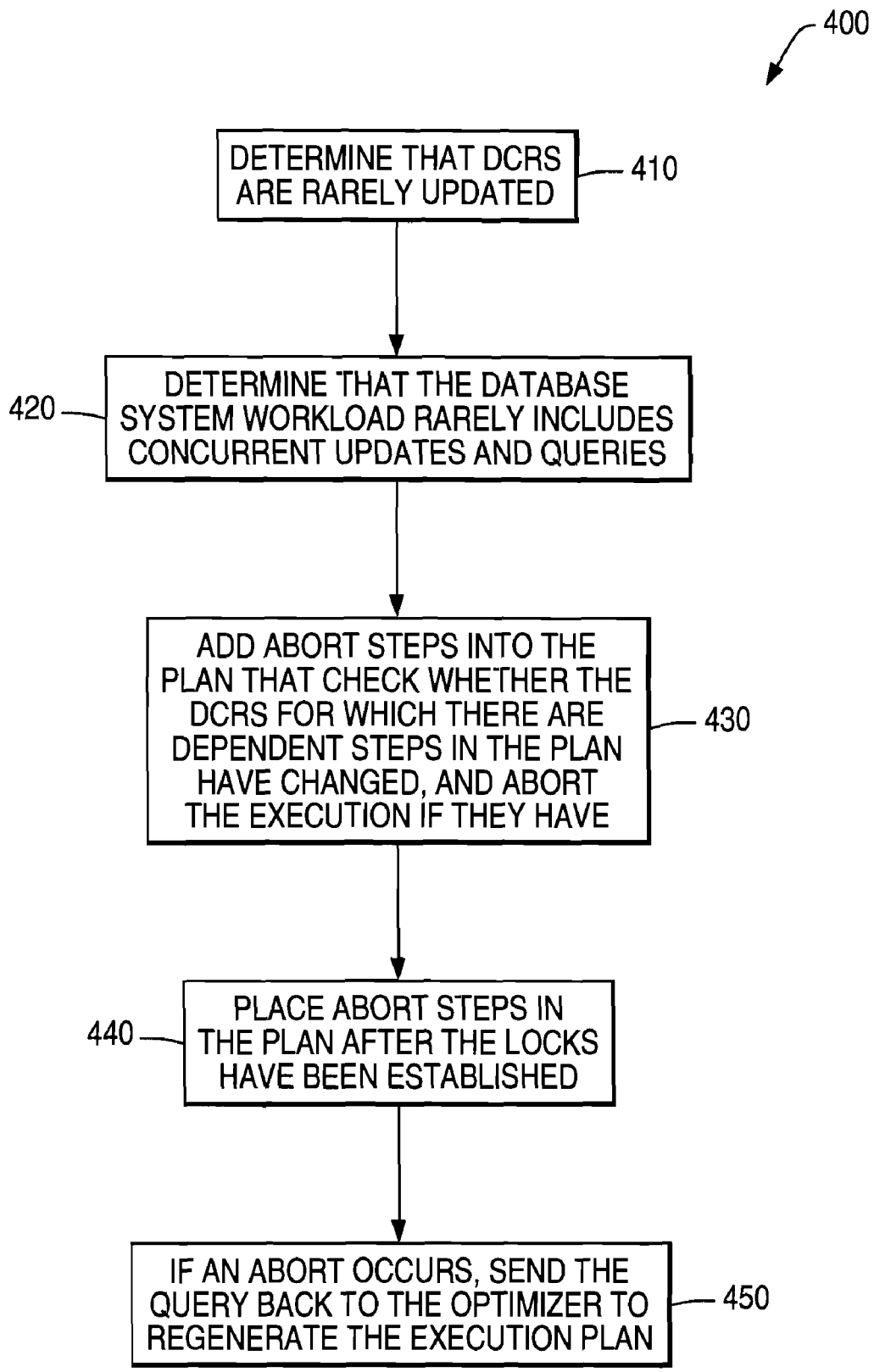
FIG. 4 is a flow chart of one method for executing database queries.

If the chosen execution plan includes one or more steps based on the DCR conditions, i.e., DCR-dependent steps, then the outcome of the query could be affected by an insert or update to the records that define the DCR. For example, if the DCR is based on a maximum thirty day relationship between the order date and the ship dates for the items in the order, then an insert of an item record that was shipped 35 days after the corresponding order date would require a change in the DCR. If there is a window of time between the generation of the execution plan and the actual execution of that plan, an update or insert could change the data so that a new DCR is required. Only inserts or relevant updates to the table with the FK and updates to the table with the PK can change the DCR. Once the plan starts execution, read locks often are placed on both tables and, as a result, updates and inserts are blocked. If these locks are not released until the end of execution, it is safe during the execution of the plan. This is the case if a full table lock is placed. It is possible to place a row hash lock at the time that the relevant table is accessed rather than before the entire execution begins. Once a row hash lock is in place, updates and inserts that could change the DCR are blocked. Between the time that the DCRs stored in the database system dictionary are accessed and the time that locks are in place, changes to the DCR could cause the lowest cost execution plan to return the wrong result. Methods for avoiding those errors must take into account the likelihood that an error will occur. For example, if it is very unlikely that a DCR will change such that a result could be in error, a method with a higher cost for correcting such an error is acceptable if it has minimum cost for queries with no error. Conversely, if errors from changed DCRs are frequent, a higher cost for queries with no error is acceptable to lower the cost for correcting errors when they occur. The method of FIG. 4 is preferable, though not required, for database systems in which errors from changed DCRs are rare. The method of FIG. 6 is preferable, though not required, for database systems in which errors from changed DCRs are frequent. The method of FIG. 5 represents a middle ground approach that attempts to minimize both the cost of correcting errors and the cost for queries with no error.

FIG. 4 is a flow chart of one method 400 for executing database queries. In the first step 410, it is determined that DCRs are rarely updated. In the second step 420, it is determined that queries that are prepared using DCRs are rarely concurrent with updates and inserts that change the DCRs. In step 430, abort steps are added to the execution plan. The abort steps abort the execution of the plan if there have been changes to DCRs for which there are dependent steps in the plan. In step 440, the abort steps are placed after the locks in the execution plan. If the locks are full table locks, the abort steps often are placed among the first steps of the plan. If the locks are row hash locks, the abort steps are placed after the locks are acquired. For example, the abort statements can be evaluated after all row hash locks are required. In another implementation, the abort statements are evaluated every time a row hash lock is acquired. In the last step 450, the abort step sends the query back to the optimizer to regenerate the execution plan if a DCR for which there is a dependent step has changed; the regeneration includes reaccessing the DCRs to identify the changed value. If the abort steps were placed after full table locks, only query generation time is wasted. If the abort steps were placed after row hash locks were acquired, some execution time may be sacrificed as well.

Figure 5:
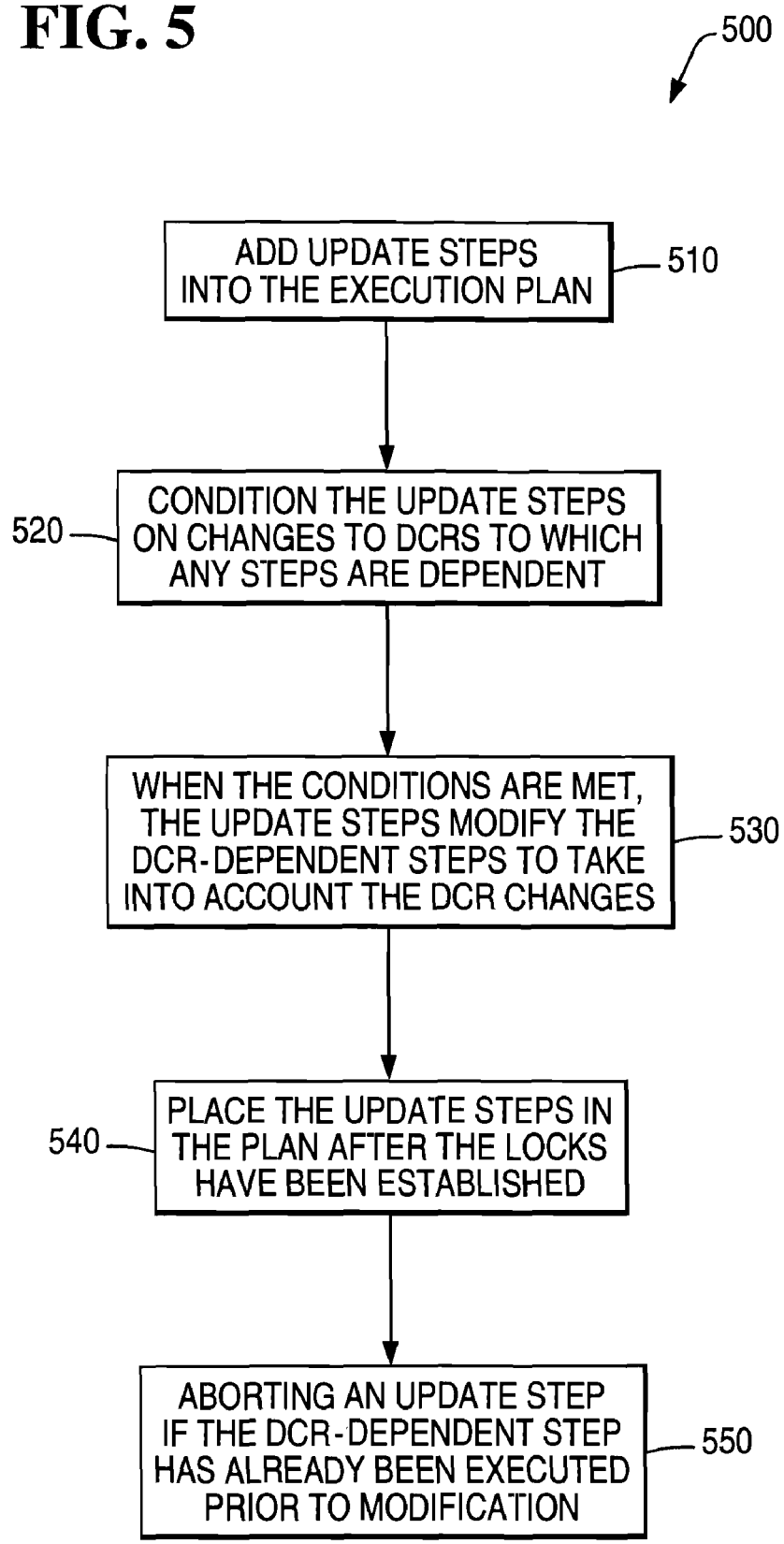
FIG. 5 is a flow chart of another method for executing database queries.
Figure 6:
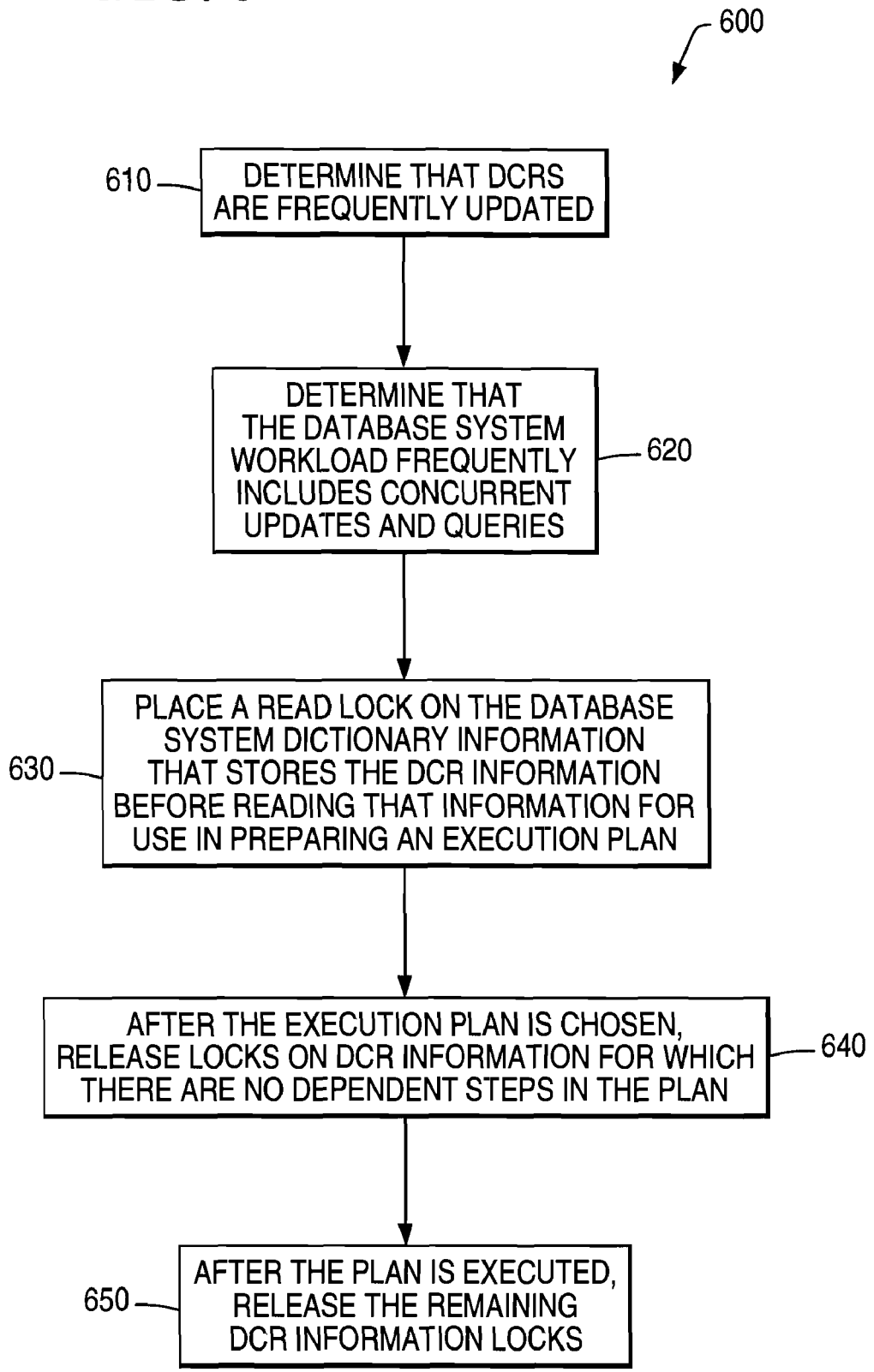
FIG. 6 is a flow chart of another method for executing database queries.

FIG. 5 is a flow chart of one method 500 for executing database queries. In the first step 510, update steps are added to the execution plan. Each update step is conditioned on changes to DCRs for which there is at least one dependent step in the execution plan as identified at step 520. When the conditions of the update steps are met in step 530, the DCR-dependent steps are modified to take into account the DCR changes. The DCR-dependent steps were identified by the parsing engine 130 during query processing. As an example, an execution step locates all records with a ship date prior to 1993-07-31, based on a 30 day maximum delay between the order date and the ship date. The update step determines that the DCR has changed to allow a maximum of 35 days difference because a record has been added/updated. Because the condition of the update step, the changed DCR, has been met, the update step then modifies the DCR-dependent execution step to locate all records with a ship date prior to 1993-08-05. The modification of the DCR-dependent steps can take place in a processing module $110_N$.

In step 540, the update steps are placed in the execution plan after locks have been acquired. As discussed with respect to FIG. 4, full table locks are acquired at the beginning of execution and row hash locks are acquired during execution when the relevant table is first accessed. The update steps, therefore, can occur before any execution occurs or after execution has started. As identified in step 550, the update steps can include an abort functionality because they can be placed after execution has started. If the row hash lock occurs after a DCR-dependent step has executed, the update step that occurs after the lock can abort if it determines that the DCR has changed.

FIG. 6 is a flow chart of one method 600 for executing database queries. Preferably, though it is not required, method implementation 600 is used when DCRs are updated frequently and those updates are frequently concurrent with queries, as identified in steps 610 and 620. In step 630, read locks can be placed on all the DCR information in the database system dictionary prior to reading that information for use by the optimizer 250 in choosing an execution plan. Once the plan is chosen, the locks on the DCR information for which there are no dependent steps can be released in step 640. After the plan is executed, the remaining locks on DCR information can be released in step 650. As a result of the locks being placed before reading the information used to generate and choose the execution plan, DCRs for which there are dependent steps do not change and query results are accurate.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for executing database queries, the database comprising a first table (T1) having a primary key (PK) column and a first correlated value column (CV1) and a second table (T2) having a foreign key (FK) column related to the primary key column of the first table and a second correlated value column (CV2), comprising the steps of:

preparing a database query for execution on a database comprising a first table (T1) having a primary key (PK) column and a first correlated value column (CV1) and a second table (T2) having a foreign key (FK) column related to the primary key column of the first table and a second correlated value column (CV2), said execution based at least in part on application of a derived constraint rule (DCR) having the following form:

$$(PK=FK) \rightarrow CV2+C1 \leq CV1 \leq CV2+C2$$

where C1 and C2 are constants, and "$\rightarrow$" means "implies," to produce an execution plan;

taking into account a frequency of errors due to changes in DCRs when preparing the execution plan, wherein taking into account the frequency of errors due to changes in DCRs when preparing the execution plan comprises determining that a higher cost execution plan that risks no errors due to changes in DCRs is preferable; and executing the plan.

2. The method of claim 1 wherein taking into account the frequency of errors due to changes in DCRs when preparing the execution plan comprises:

determining that a higher cost execution plan that may require correction of an error due to changes in DCRs is preferable because it has a low cost if there is no error due to changes in DCRs.

3. The method of claim 1 wherein taking into account the frequency of execution errors due to changes in DCRs when preparing the execution plan comprises:

selecting an execution plan that balances the cost of correcting errors due to changes in DCRs and the cost of execution without errors due to changes in DCRs.

4. A computer program, stored on a tangible storage medium, for executing database queries, the database comprising a first table (T1) having a primary key (PK) column and a first correlated value column (CV1) and a second table (T2) having a foreign key (FK) column related to the primary key column of the first table and a second correlated value column (CV2), the program comprising executable instructions that cause one or more computers to:

prepare a database query for execution on a database comprising a first table (T1) having a primary key (PK) column and a first correlated value column (CV1) and a second table (T2) having a foreign key (FK) column related to the primary key column of the first table and a second correlated value column (CV2), said execution based at least in part on application of a derived constraint rule (DCR) having the following form:

$$(PK=FK) \rightarrow CV2+C1 \leq CV1 < CV2+C2$$

where C1 and C2 are constants, and "$\rightarrow$" means "implies," to produce an execution plan;

take into account a frequency of execution errors due to changes in DCRs when preparing the execution plan, wherein when taking into account the frequency of errors due to changes in DCRs when preparing the execution plan, the executable instructions cause one or more computers to determine that a higher cost execution plan that risks no errors due to changes in DCRs is preferable; and execute the plan.

5. The computer program of claim 4 wherein when taking into account the frequency of errors due to changes in DCRs when preparing the execution plan, the executable instructions cause one or more computers to:

determine that a higher cost execution plan that may require correction of an error due to changes in DCRs is preferable because it has a low cost if there is no error due to changes in DCRs.

6. The computer program of claim 4 wherein when taking into account the frequency of errors due to changes in DCRs when preparing the execution plan, the executable instructions cause one or more computers to:

selecting an execution plan that balances the cost of correcting errors due to changes in DCRs and the cost of execution without errors due to changes in DCRs.

7. A database system for executing database queries, comprising:

one or more nodes;

a plurality of CPUs, each of the one or more nodes providing access to one or more CPUs;

a plurality of virtual processes, each of the one or more CPUs providing access to one or more virtual processes;

each virtual process configured to manage data, including rows organized in tables, stored in one of a plurality of data-storage facilities;

a first table (T1) having a primary key (PK) column and a first correlated value column (CVO;

a second table (T2) having a foreign key (FK) column related to the primary key column of the first table and a second correlated value column (CV2), and an optimizer configured to:

prepare a database query for execution based at least in part on application of a derived constraint rule (DCR) having the following form:

$$(PK=FK) \rightarrow CV2+C1 \leq CV1 \leq CV2+C2$$

where C1 and C2 are constants, and "$\rightarrow$" means "implies," to produce an execution plan; and take into account the frequency of execution errors due to changes in DCRs when preparing the execution plan, wherein when the optimizer takes into account the frequency of errors due to changes in DCRs when preparing the execution plan it determines that a higher cost execution plan that risks no errors due to changes in DCRs is preferable.

8. The system of claim 7 wherein when the optimizer takes into account the frequency of errors due to changes in DCRs when preparing the execution plan it:

determines that a higher cost execution plan that may require correction of an error due to changes in DCRs is preferable because it has a low cost if there is no error due to changes in DCRs.

9. The system of claim 7 wherein when the optimizer takes into account the frequency of errors due to changes in DCRs when preparing the execution plan it:

selects an execution plan that balances the cost of correcting errors due to changes in DCRs and the cost of execution without errors due to changes in DCRs.

* * * * *